A. D. WELKER & L. E. & H. H. SNYDER.
POTATO CUTTING APPARATUS.
APPLICATION FILED JAN. 24, 1912.

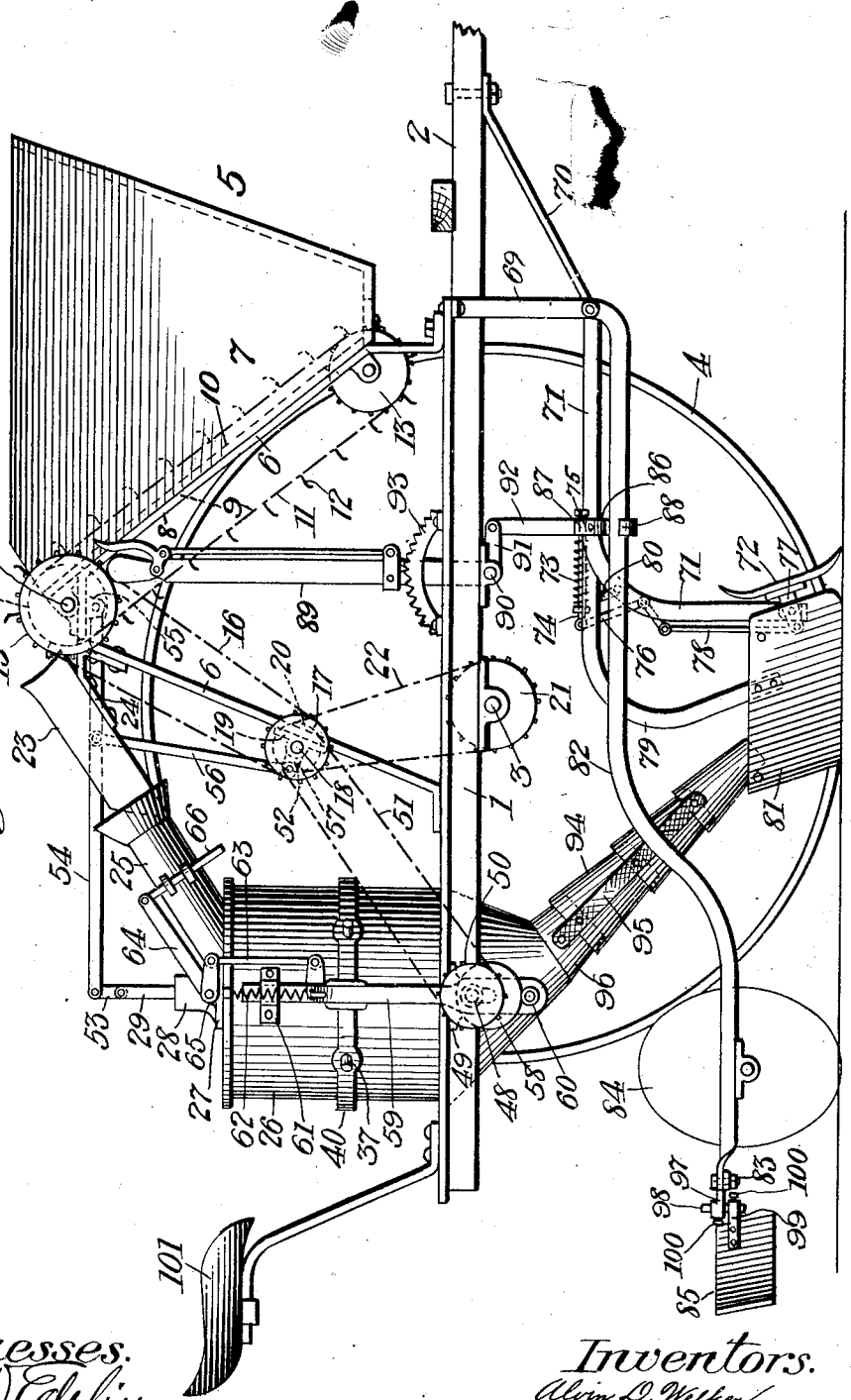

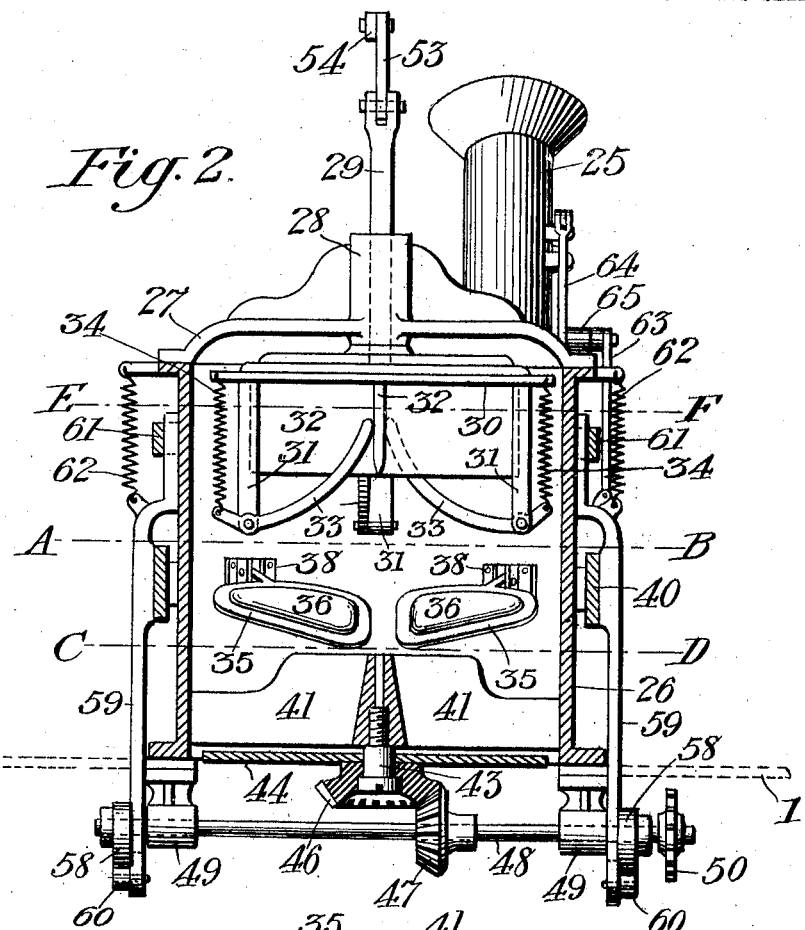

1,058,821.

Patented Apr. 15, 1913.

3 SHEETS—SHEET 3.

UNITED STATES PATENT OFFICE.

ALVIN D. WELKER, OF WADSWORTH, AND LIONEL E. SNYDER AND HERBERT H. SNYDER, OF BARBERTON, OHIO.

POTATO-CUTTING APPARATUS.

1,058,821.  Specification of Letters Patent.  Patented Apr. 15, 1913.

Application filed January 24, 1912. Serial No. 673,104.

*To all whom it may concern:*

Be it known that we, ALVIN D. WELKER, a citizen of the United States, residing at Wadsworth, in the county of Medina and State of Ohio, and LIONEL E. SNYDER and HERBERT H. SNYDER, citizens of the United States, residing at Barberton, in the county of Summit and State of Ohio, have invented certain new and useful Improvements in Potato-Cutting Apparatus, of which the following is a full, clear, and exact description.

The primary object of this invention is to provide a cutting apparatus for a combined apparatus for cutting and planting potatoes.

The invention consists of a potato cutting apparatus which quarters or otherwise divides the potatoes and drops them piece by piece, all as we will proceed now more particularly to describe and then claim.

Figure 4:
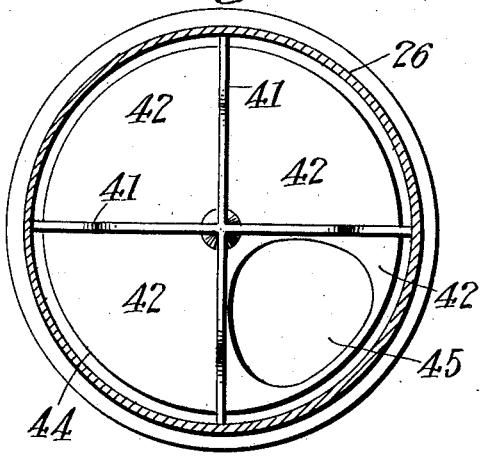
Figure 5:
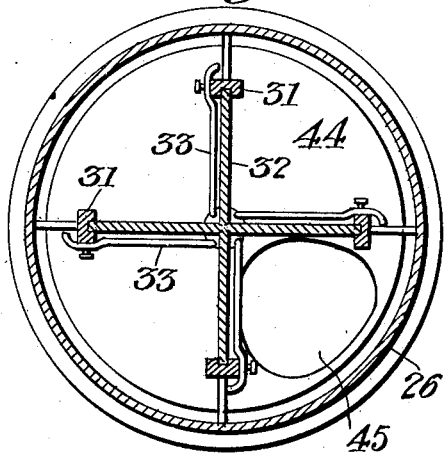

In the accompanying drawings illustrating the invention, in the several figures of which like parts are similarly designated, Figure 1 is a side elevation. Fig. 2 is a vertical section, on a larger scale, of the potato cutting and dropping apparatus, taken transversely to Fig. 1, and looking in the direction of the line of draft of the machine. Fig. 3 is a horizontal section, taken substantially in the plane of line A B, Fig. 2. Fig. 4 is a horizontal section, taken substantially in the plane of line C D, Fig. 2. Fig. 5 is a horizontal section taken substantially in the plane of line E F, Fig. 2.

1 is the main frame provided at its forward end with the tongue 2 or other draft mechanism by which the machine may be drawn over the field in any suitable manner.

3 is the axle and 4 the wheels for supporting the machine upon the ground.

5 is a hopper, mounted on frame 1; 6 are standards for said hopper; 7 are the inclined rear portions of the hopper's side walls; 8 is the rear wall of the hopper, slotted longitudinally, at 9, and flanked by strips 10.

11 is an endless carrier, having elevator buckets 12, and mounted on pulleys 13, and arranged to travel in the slotted rear wall of the hopper.

The shaft 14 upon which the upper sprocket 13 is mounted is extended beyond the walls of the hopper and upon its outer end is mounted a sprocket wheel 15, which in turn is connected by a chain 16 with a sprocket 17, mounted on a shaft 18 suitably supported in bearings 19 fastened to the standards 6. The shaft 18 may be driven from the axle 3, or otherwise, as by sprocket 20 on shaft 18 and sprocket 21 on the axle 3 and chain 22 connecting said sprockets.

23 is a chute suitably supported at the discharge end of the hopper, as by a bracket 24 fixed to the standards 6, said chute receiving the potatoes as they are discharged from the hopper and delivering them into a spout 25 opening into the cutting apparatus.

The cutting apparatus comprises a box or receptacle 26 suitably mounted upon the rear of the frame 1 and preferably to one side of the longitudinal center thereof, so that the potatoes may be properly discharged into the cutting apparatus, by arranging the spout 25 to one side thereof and in line with the potato feeding devices.

Secured to and extending across the top of the box or receptacle 26 is frame 27 having a central guide bearing 28 for the stem or shank 29 of the cutter head. The cutter head comprises a spider frame 30 (see Fig. 2) having four diagonally disposed depending legs 31, and knives 32 arranged at right angles to each other and suitably fixed in and carried by said spider frame. Pivoted to the lower ends of the legs 31 are a series of hold-down fingers 33 having their inner ends curved or inclined inwardly and upwardly and extending beyond the cutting edges of the knives 32. Springs 34 are connected with the other ends of said fingers and with the outer edge of the spider frame 30, and serve to hold said fingers in contact with the cutting blades or knives to properly position the fingers but permit a yielding action of the fingers during the operation of the cutter head.

Arranged in the cutting box just below the cutter head are a series of gates 35, preferably four, and so arranged that the spaces between the edges of the gates will coincide with the cutting knives and their attached hold-down fingers and thus permit the passage of the knives beyond the gates during the cutting stroke of the cutter head. These gates 35 are, as clearly shown in Figs. 2 and 3, preferably substantially triangular or quadrant in outline and have their central portions bulged or rounded upwardly, as at 36, for a purpose presently appearing. The gates 35 are provided with tail-pieces 37 by which they are pivoted in suitable brackets 38 fixed upon the inside of the cutting box 26, said tail-pieces projecting through openings 39 in the wall of the box, and engaging a ring 40 surrounding the box.

Fixed in the bottom of the cutting box 26 are diametrical partitions 41 which are so arranged as to form a compartment 42 beneath each gate 35, into which the gates will discharge their respective pieces of cut potato.

Mounted upon a stud 43 below the partitions 41 is a rotating disk 44, which forms a bottom for the several compartments 42. This disk is provided with an opening 45, Figs. 4 and 5, adapted to register successively with said compartments during its rotation to discharge the pieces of potatoes from the compartments. Also secured to the stud 43 is a bevel gear 46 meshing with a similar gear 47 on a shaft 48 supported in bearings 49 secured to the underside of frame 1. A sprocket wheel 50 is secured to one end of shaft 48 and connected by a chain 51 with a sprocket wheel 52 on shaft 18 (see Fig. 1). It will thus be seen that the disk 44 is continuously rotated during the travel of the machine.

Connected to the upper end of the stem or shank 29 of the cutter head, by a link 53, is a lever 54, pivoted in a suitable bearing 55 on standard 6. A pitman 56 connects lever 54 with a crank 57 fixed to shaft 18, and during the travel of the machine, operates said lever to effect a reciprocation of the cutter head.

Secured upon the opposite ends of shaft 48 are cams 58, and also loosely fitted upon the shaft 48 between the brackets 49 and the cams 58 are reciprocating rods 59 provided with rollers 60 at their lower ends to be engaged by the cams 58 and having their upper ends fitted in guide-blocks 61 fixed to the cutting box 26. The cams 58 serve to move the rods 59 in a downward direction, and springs 62 connected to said rods at one end and to the box or receptacle 26 at their other ends, serve to move the rods in the other or upward direction. The ring 40 is secured to the reciprocating rods 59 and is reciprocated thereby during the travel of the machine, and the gates 35 having their tail-pieces 37 engaging the ring 40 are alternately closed and opened thereby to support the potatoes while being cut and thereafter discharge the pieces. Also connected with one of the reciprocating rods 59, as shown to the right in Fig. 2 and in elevation in Fig. 1, is a link 63 connected at its upper end with the short arm of a bell crank lever 64, mounted in a suitable bearing 65 fixed upon the box 26, the long arm of said lever 64 being connected with a reciprocating gate 66 of suitable construction fitted in the spout 25 and adapted to be opened and closed by the reciprocation of the rod 59. This gate serves to detain a potato fed into the spout until the potato in the cutting box has been cut and discharged and the gate becomes operative to admit the detained potato into the cutting box for the next cutting stroke of the cutter-head.

Secured to the frame 1 beneath the hopper 5 is a rigid sub-frame 69, suitably braced by a strut 70 secured to a fixed member. Pivoted to the sub-frame 69 are arms 71 which extend rearwardly and downwardly to about the center of the machine and have pivoted thereto a reversible cultivator plow or blade 72. This plow is held in proper working position by means of a compression spring 73 mounted upon a rod 74 suitably guided in a pivot block 75 secured to a lift bar, explained later. The rod 74 is connected with the long arm of a bell crank lever 76 suitably mounted between the arms 71, the other and shorter arm of said lever being connected with the shank 77 of the plow 72 by means of a rod 78.

79 in Fig. 1, designates a pair of curved arms pivoted to the arms 71 and to the lift bar to be referred to, and extending rearwardly and downwardly beyond the arms 71 and their attached plow and supported upon a bar 80 adjustably secured to the arms 71. These arms 79 have attached to their lower ends the furrow-opening blades 81, said blades diverging rearwardly from opposite sides of the plow 72 and rigidly held apart by suitable spacer bars fixed therebetween, so that the advance ends thereof are just a little closer together than the width of the plow 72. Longer arms 82 are also pivoted to the sub-frame 69 at the front of the machine and extend rearwardly to the rear end of the machine, where they are adjustably secured to a spacer bar 83. Mounted upon these arms 82 in advance of the bar 83 are rotary disks or shovels 84. Adjustably secured to the bar 83 is a leveler 85.

A lifting bar 86 extends transversely beneath the arms 71 and preferably is fastened thereto and to the arms 79, as by clips 87, said bar also extending beneath the arms 82, and provided at its ends with stirrup-like bends 88 to receive said arms 82.

89 is a hand lever having a pawl and ratchet locking mechanism and fixed to a rock-shaft 90 arranged transversely on the main frame. This rock-shaft has a crank arm 91 which is connected with the pivot block 75 of the lift bar 86 by means of a rod 92. By means of the hand-lever the several pivoted under-frames may be lifted and lowered as desired; and in order to hold the frame 71 in the lowered position as well as to hold both frames in the lifted position, the hand lever coöperates with a toothed segment 93.

94 is a flexible spout through which the cut potatoes are delivered to the ground at a point between and at the rear of the furrow opening blades 81. This flexible spout may be composed of a series of truncated cone-like tubes connected to one another by flexible connections 95 which in turn are connected to a discharge pipe 96 at the bottom of the cutter box 26.

We have already mentioned the fact that the leveler 85 is adjustably mounted on the spacer bar 83. One form of such adjustable mounting is shown in detail in Fig. 1, and consists of a bracket 97 fast on said spacer bar and adapted to receive a pin 98 extending up over a bracket 99, the latter being fast to the leveler. As shown, the pin 98 may be adjusted in either or both of the brackets and the adjustment fixed by means of the set-screws 100.

101 is the usual seat secured to the rear of the frame for the operator.

The operation is as follows:—The potatoes as they enter the cutting box one by one from the spout 25, pass through the cutter-head and are caught upon the gates 35 and centered thereupon by the inclination and convex surfaces of the gates, the gates being held in closed position by ring 40. The cutter head is then caused to descend through its operating lever 54, pitman 56 and their driving mechanism from the axle, and the spring fingers 33 coming in contact with the potato in advance of the cutting knives further tend by their inward and upward inclination to center the potato and to hold it upon the gates 35 for the further descent and cutting action of the knives, the spring fingers yielding to permit the movement of the knives into and through the potato and through the spaces between the edges of the gates 35. The potato is thus cut into four pieces, each of said pieces resting on its respective gate. The ring 40 is drawn upwardly by the springs 62, and the gates 35 opened to drop the pieces of potato into their respective compartments 42 upon the rotating disk 44, the bulged or convex surfaces 36 of the gates 35 facilitating the falling of the pieces from the gates. The cutter head is then returned on its up stroke. One of the pieces of potato will fall through the opening 45 in the rotating disk 44, and as the disk continues to rotate, the several pieces of potato will be discharged successively from their respective compartments as the opening 45 in the disk 44 passes or registers with the successive compartments. The pieces of potato as they are thus regularly discharged from the cutting box enter the flexible chute 94 and are delivered therefrom into the furrow formed by the plow 72 and opener blades 81, and as the machine moves along, the dirt rolls in the furrow behind the opener blades 81 and partly covers the potatoes, and the shoveling disks 84 throw the soil inwardly upon both sides of and cover in the furrow and the potatoes dropped therein. The leveler 85 then follows and levels off the hills formed by the shoveling disks 84. The parts of the machine and the gearing for operating the same are so arranged and timed that as a potato is being delivered from the hopper into the spout 25 the cut-off or gate 66 will be closed to retain the potato. The cutter head returning on its upward stroke, the gates 35 moving from their opened or dropping position, and the cutter head approaching the limit of its upward stroke, the cut-off 66 in spout 25 will be opened and the potato dropped therefrom into the cutting box and the gates 35 returned to their closed position to catch and center the potato. The cutter head then moves on its down stroke and cuts the potato. The gates are moved downward or to their open position and the pieces of cut potato dropped therefrom into their respective compartments, and then the cutter head is returned on its upward stroke. The gates 35 then return to their closed position ready to receive the next potato which in the meantime has been delivered into spout 25 and retained therein by the cut-off 66, and as the gates 35 reach their closed position, said cut-off 66 is operated to release the potato which falls into the cutting box upon the gates 35 to be cut by the next down stroke of the cutter head and the operations above described repeated. During the return of the gates 35 and before the completion of the cutting stroke of the cutter head, the disk 44 is given a complete revolution and the pieces of cut potato successively dropped from the several compartments through the opening 45 in said disk, and the compartments ready to receive the pieces of potato cut by the next succeeding stroke of the cutter head. The pieces of potato as thus discharged from the cutting box are delivered through the flexible chute 94 and fall upon the ground at regular intervals ready to be covered by the planting mechanism.

The gearing may be changed in any suitable or approved manner to vary the time of operation of the several parts to vary the intervals of the dropping of the cut potatoes in accordance with the distance apart it may be desired to plant the seed or cut potatoes.

It is sometimes necessary to plant whole potatoes, particularly when the seed potatoes are too small to be cut, and for this purpose the mechanism for reciprocating the cutter head and for operating the cut-off 66, gates 35 and disk 44 may be thrown out of operation, and the gearing for operating the elevator changed to cause the elevator to travel four times the speed required for feeding the potatoes when the cutting operation is being carried on, and the cut-off 66 be withdrawn from the spout 25, the gates 35 lowered to their open position, and the disk 44 positioned with its opening 45 registering with the compartment 42 immediately beneath the spout 25, whereby the whole potatoes as they are fed into the spout 25 fall directly through the cutting box into the chute 94 and are discharged therefrom onto the ground at regular intervals, in accordance with the speed of the elevator, to be planted by the planting mechanism. Furthermore, provision may be made for throwing out of operation the gearing for operating the several parts of the feeding and cutting apparatus when the machine is being drawn to and from the place of planting.

While we have herein shown and described and claimed the axle as the motive power, it is to be understood that any other motive power, either connected with or independent of the axle may be used, and the claims are to be understood accordingly. It is also to be understood that the gearing shown and described may be varied within the principle of the invention so long as it is capable of getting the speeds necessary for the several moving parts.

What we claim is:—

1. In a potato cutting apparatus, a cutting box, means for delivering potatoes to said cutting box, a reciprocating cutter head in said cutting box through which the potatoes pass, a series of gates pivoted in said cutting box below said cutter head, means for closing said gates to support the potatoes while being cut and for opening the gates to discharge the cut potatoes therefrom, and operating mechanism common to and connected with the several moving parts.

2. In a potato cutting apparatus, a cutting box, means for delivering potatoes to said cutting box, a reciprocating cutter head in said cutting box through which the potatoes pass, a series of gates pivoted in said cutting box below the cutter head, means for closing said gates to support the potatoes while being cut and for opening the gates to discharge the cut potatoes therefrom, a series of compartments in said cutting box to receive the cut potatoes as they are discharged from said gates, a rotating disk arranged below said compartments and provided with an opening registering successively with said compartments whereby the cut potatoes are discharged successively from the compartments during the rotation of the disk, and operating mechanism common to and connected with the several movable parts.

3. A potato cutting apparatus, comprising a box, a cutter head mounted to reciprocate therein and comprising a spider frame and knives carried thereby and arranged at right angles to each other, a series of gates pivoted in said box below said cutter head and spaced apart to permit the passage of the cutting knives therebetween and having tail-pieces projecting through the box, a ring surrounding said box and engaging said tail-pieces, and means for reciprocating said ring to close said gates to support the potatoes while being cut and to open the gates to discharge the cut potatoes therefrom.

4. A potato cutting apparatus, comprising a box, a cutter head mounted to reciprocate therein and comprising a spider frame and knives carried thereby and arranged at right angles to each other, a series of downwardly inclined gates pivoted in said box below said cutter head and spaced apart to permit the passage of the knives therebetween and having tail-pieces projecting through the walls of said box, a ring surrounding the box and engaging said tail-pieces, and means for reciprocating said ring to close said gates to cause them to center and support the potato while being cut and to open the gates to discharge the cut potato therefrom.

5. A potato cutting apparatus, comprising a box, a cutter head mounted to reciprocate therein and comprising a spider frame and knives carried thereby and through which the potato passes, a series of downwardly inclined gates pivoted in said box below said cutter head and having bulged or convex supporting surfaces, and tail-pieces projecting from said gates and extending through the box, a ring surrounding the box and engaging said tail-pieces, and means for reciprocating said ring to close the gates to center and support each potato while being cut and to open the gates to discharge the cut potato therefrom, the bulged or convexed portions of the gates facilitating the centering of the cut potato and its fall therefrom.

6. A potato cutting apparatus, comprising a box, a cutter head mounted to reciprocate therein and comprising a spider frame and knives carried thereby and through which the potatoes pass, a series of downwardly inclined gates pivoted in said box below said cutter head and provided with tail-pieces extending through the walls of the box, spring fingers carried by said cutter head to engage and center the potatoes upon said gates, a ring surrounding the box and engaging said tail-pieces, and means for reciprocating said ring to close the gates to support the potatoes while being cut and to open the gates to discharge the cut potatoes therefrom.

7. A potato cutting apparatus, comprising a box, a cutter head mounted to reciprocate therein and comprising a spider frame and knives carried thereby and through which the potatoes pass, a series of downwardly inclined gates pivoted in said box below said cutter head and provided with tail-pieces extending through the walls of said box, spring fingers carried by said cutter head to engage and center the potatoes upon said gates, a ring surrounding the box and engaging said tail-pieces, means to reciprocate said ring to close the gates to support the potatoes while being cut and to open said gates to discharge the cut potatoes therefrom, a series of compartments for the cut potatoes below said gates, means for discharging the cut potatoes from said compartments successively, and operating mechanism common to and operatively connected with said moving parts.

8. A potato-cutting apparatus, comprising a box, a cutter head mounted to reciprocate therein and comprising a spider frame and knives carried thereby and through which the potatoes pass, a series of downwardly inclined gates pivoted in said box below said cutter head and provided with tail-pieces extending through the walls of said box, spring fingers carried by said cutter head to engage and center the potatoes upon said gates, a ring surrounding the box and engaging said tail-pieces, means to reciprocate said ring to close the gates to support the potatoes while being cut and to open said gates to discharge the cut potatoes therefrom, a series of compartments for the cut potatoes below said gates, and a rotating disk below said compartments provided with an opening registering successively with said compartments for successively discharging the cut potatoes from said compartments during the rotation of the disk, and a power medium coöperatively connecting the moving parts.

9. In a potato cutting apparatus, a cutting apparatus comprising a box, a reciprocating cutter head arranged in said box, a series of gates pivoted in said box below said cutter head and provided with tail-pieces extending through the walls of said box, a ring surrounding the box and engaging said tail-pieces, rods connected to said ring, and means to reciprocate said rods and their attached ring to close the said gates to support the potatoes while being cut and to open the gates to discharge the cut potatoes therefrom.

10. In a potato cutting apparatus, a cutting apparatus comprising a box, a cutter head arranged in said box, means to reciprocate said cutter head, a series of gates pivoted in said box and provided with tail-pieces extending through the walls of said box, a ring surrounding the box and engaging said tail-pieces, rods connected to said ring, means to reciprocate said rods and their attached ring to close the gates to support the potatoes when being cut and to open the gates to discharge the cut potatoes therefrom, a series of compartments in said box below said gates, a disk for closing the bottom of said compartments and provided with an opening registering successively with said compartments, and means to rotate said disk to discharge the cut potatoes from said compartments successively.

11. In a potato cutting apparatus, a main frame and a driving shaft, a cutting apparatus mounted upon said frame and comprising a box, a cutter head arranged in said box, a spout for delivering potatoes into the upper end of said box, a sliding cut-off in said spout for controlling the delivery of the potatoes to the box, an operating lever for said cutter head and gearing connecting said lever with the shaft to reciprocate said cutter head, a series of gates pivoted in said box below said cutter head and provided with tail-pieces extending through the walls of the box, a ring surrounding the box and engaging said tail-pieces, rods connected to said ring, connections between said rods and the sliding cut-off in said spout, and gearing connecting said rods with the shaft to reciprocate said rods and their attached ring to close said gates to support the potatoes while being cut and to open the gates to discharge the cut potatoes therefrom and to operate said sliding cut-off to control the delivery of the potatoes to the cutting apparatus.

In testimony whereof we have hereunto set our hands this 19th day of January A. D. 1912.

ALVIN D. WELKER.
LIONEL E. SNYDER.
HERBERT H. SNYDER.

Witnesses:
JOHN D. OWEN,
ERWIN L. METTING.

Copies of this patent may be obtained for five cents each, by addressing the "Commissioner of Patents, Washington, D. C."